(12) United States Patent
Quere et al.

(10) Patent No.: US 6,393,929 B1
(45) Date of Patent: May 28, 2002

(54) REDUCING MOTOR, PARTICULARLY FOR OPERATING VEHICLE FITTINGS

(75) Inventors: Jèrôme Quere, Monde-Ville; Hervé Laurandel, Caen, both of (FR)

(73) Assignee: Meritor Light Vehicle Systems-France (FR)

( * ) Notice: Subject to any disclaimer, the term of this patent is extended or adjusted under 35 U.S.C. 154(b) by 0 days.

(21) Appl. No.: 09/180,690

(22) PCT Filed: May 13, 1997

(86) PCT No.: PCT/FR97/00848

§ 371 (c)(1),
(2), (4) Date: Jul. 26, 1999

(87) PCT Pub. No.: WO97/43564

PCT Pub. Date: Nov. 20, 1997

(30) Foreign Application Priority Data

May 13, 1996 (FR) .............................................. 96 05924
Mar. 11, 1997 (FR) .............................................. 97 02873

(51) Int. Cl.$^7$ .......................... F16H 19/04; F16H 55/14
(52) U.S. Cl. ............................ 74/411; 74/89.17; 74/425
(58) Field of Search ........................ 74/411, 425, 89.14, 74/89.17; 464/73, 76, 92, 149, 97, 75; 49/460; 242/125.1

(56) References Cited

U.S. PATENT DOCUMENTS

| | | | | |
|---|---|---|---|---|
| 3,455,174 A | * | 7/1969 | Pickles | 74/89.14 |
| 4,748,865 A | * | 6/1988 | Umezawa et al. | 74/425 |
| 4,899,608 A | * | 2/1990 | Knappe et al. | 74/411 X |
| 4,995,568 A | * | 2/1991 | Yamagishi et al. | 242/125.1 |
| 5,040,430 A | * | 8/1991 | Adam et al. | 74/89.14 X |
| 5,062,241 A | * | 11/1991 | DeLand | 49/460 |
| 5,178,026 A | * | 1/1993 | Matsumoto | 74/425 X |
| 5,212,999 A | * | 5/1993 | Kitada | 74/425 |
| 5,267,482 A | * | 12/1993 | Yoshida et al. | 74/425 |
| 5,956,998 A | * | 9/1999 | Fenelon | 74/89.17 X |

* cited by examiner

Primary Examiner—David A. Bucci
Assistant Examiner—Colby Hansen
(74) Attorney, Agent, or Firm—Carlson, Gaskey & Olds

(57) ABSTRACT

This motorized reduction gear comprises a rotor equipped with a rotor shaft, a reduction gearbox (2) containing a gearwheel (3) in mesh with an endless screw of the shaft, a damper (5) housed in the wheel, and secured thereto so that they rotate as one; the single-piece damper has peripheral cut-outs (8) designed to accommodate, on the one hand, radial fins (7) of the wheel and, on the other hand, elements (10) for driving an output member (11), and the edges of the cut-outs are chamfered (38). The chamfers ensure that the angular deflection of the damper as a function of the torque is gradual and make it easier to fit automatically onto the hub of the gearwheel.

19 Claims, 5 Drawing Sheets

REDUCING MOTOR, PARTICULARLY FOR OPERATING VEHICLE FITTINGS

The subject of the present invention is a motorized reduction gear, particularly for driving vehicle equipment, of the type comprising a rotor equipped with a rotor shaft, a reduction gearbox which contains an endless screw in mesh with a gearwheel containing a damper together with means of sealing the box, and an output member rotated by the damper.

Reduction gearboxes of current motorized reduction gears comprise the following parts: gearwheel, hub, lip seal, cover and plastic drum onto which a cable, for example a window-lifter cable, can be wound or a pinion made of sintered steel and an overmoulded plastic hub.

This structure contains a relatively high number of parts, and this leads to a relatively high cost of manufacture.

Furthermore, there is axial play in the line of shaft mounted in the motorized reduction gear. This axial play is due to the combination of spread on the dimensions of the various parts on assembly (shaft, stop, box, case, etc.), these various parts placed end to end being shorter than their housings.

Hitherto, this axial play has been compensated for manually using a screw housed in the end of the box facing the rotor shaft hole, and which is locked by an adhesive which at the same time provides a seal. This adjustment process takes a long time and is therefore expensive and increases the cost of manufacture of the motorized reduction gear.

U.S. Pat. No. 5,169,245 describes a motorized reduction gear in which the axial play is compensated for by a coil spring exerting an axial thrust on the end of the rotor shaft, with the insertion of a part which can come into abutment against a shoulder of the box when the spring has been compressed by a given amount. In such a device, the spring compresses under—the effect of the axial force and, when the direction of rotation of the motorized reduction gear is reversed, the energy stored up in the spring is suddenly released. Thus, the opposite end of the rotor shaft is pressed violently against the end of the stator, and this causes a very annoying noise.

Finally, another problem is the result of a ring being crimped between the shaft of the motorized reduction gear and the stator. This is because the inside diameter of this ring varies as a result of the irregularities of the diameter of its housing in the end of the stator. Thus, the radial clearance between the shaft and the ring has irregularities, and these cause annoying shaft oscillations.

The object of the invention is to produce a motorized reduction gear whose structure is simplified compared with the known motorized reduction gears and which is therefore of a lower cost of manufacture.

The invention also sets out to obtain better control over the inside diameter between the rotor shaft and the ring inserted between it and the stator, in order to reduce the shaft oscillations.

Another object of the invention is to produce automatic compensation for the axial play of the line of shafts in the motorized reduction gear using means which are simple, effective and inexpensive and which furthermore run no risk of damaging the adjustment device.

In accordance with the invention, the sealing means comprise an annular wall of the gearwheel and a seal arranged between the said wall and the wall of the box, and this seal is secured either to the box and resting with sliding on the annular wall or to the annular wall and resting with sliding on the box, sealing being achieved between at least one lip of the seal and the said annular wall.

According to one feature of the invention, the damper is made as one piece, has peripheral cut-outs designed to accommodate, on the one hand, radial fins of the wheel and, on the other hand, elements for driving an output member, and the edges of the cut-outs are chamfered.

According to one embodiment of the invention, the damper is equipped on at least one of its faces with means of centring in a cavity delimited between the wheel and the output member and for leaving the volume needed for the damper to expand when compressed.

The chamfers on the damper have a two-fold advantage: on the one hand, they ensure that the angular deflection of the damper as a function of the torque is gradual and, on the other hand, they make the damper easier to fit automatically onto the hub of the gearwheel.

According to another feature of the invention, the motorized reduction gear comprises an output member which consists of a drum coaxial with a damper, with the seal, and with the gearwheel, the damper being housed in the wheel and secured to it so that they rotate as one; the drum is intended to receive a cable, particularly for a window-lifter of the cable-operated type; it being possible for this drum to be equipped with means for securing it to the damper so that the two rotate as one.

These securing means may consist of the fingers of the drum which cooperate with the damper.

Thus, the damper itself drives the drum directly instead of the intermediate plastic hub, which can be omitted, this reducing the number of parts in the system.

According to another feature of the invention, the output member is a pinion made as a single piece with a hub inside the gearwheel, preferably made of sintered steel. This one-piece embodiment of the pinion and of the hub reduces the cost of manufacture compared with the cost of the corresponding earlier parts which were obtained by overmoulding the hub onto the sintered pinion.

According to another specific feature of the invention, the means for automatically adjusting the axial play comprise a damping stop made of an elastomeric material and a metallic washer embedded in this stop and against which the end of the shaft bears with preload in order to automatically compensate for the axial play.

This stop system makes it possible to limit to a predetermined value the axial compressive load experienced by the damper when the motorized reduction gear is in operation.

Furthermore, the fact of using an elastomeric damper rather than a coil spring avoids the drawbacks associated with the latter. Indeed, an elastomeric element has the property of absorbing some of the energy or deformation by internal friction between the molecular chains of the elastomeric material. This absorption of some of the energy generated by the bearing force makes it possible to considerably reduce the loudness of the annoying noise when the motor direction reverses.

The maximum force experienced by the damper may, for example, be 100 newtons, in accordance with the standards in force. Beyond this value, the axial force developed by the rotor shaft during the operation of the motorized reduction gear is exerted on the wall of the box via the stop system, and this avoids any possibility of the damper being damaged by an excessive axial force.

The rigid stop is advantageously fitted with a means for preventing it from rotating about the axis of the rotor shaft.

Other specific features and advantages of the invention will become clear during the description which will follow, given with reference to the appended drawings which illustrate a number of embodiments thereof by way of non-limiting examples.

FIG. 1A is a part section view on 2.2 of FIG. 1 of a seal between the wall of the box and a collar of the gearwheel.

FIG. 4 is a perspective view of a pinion that may constitute the output member of the motorized reduction gear.

Figure 1:
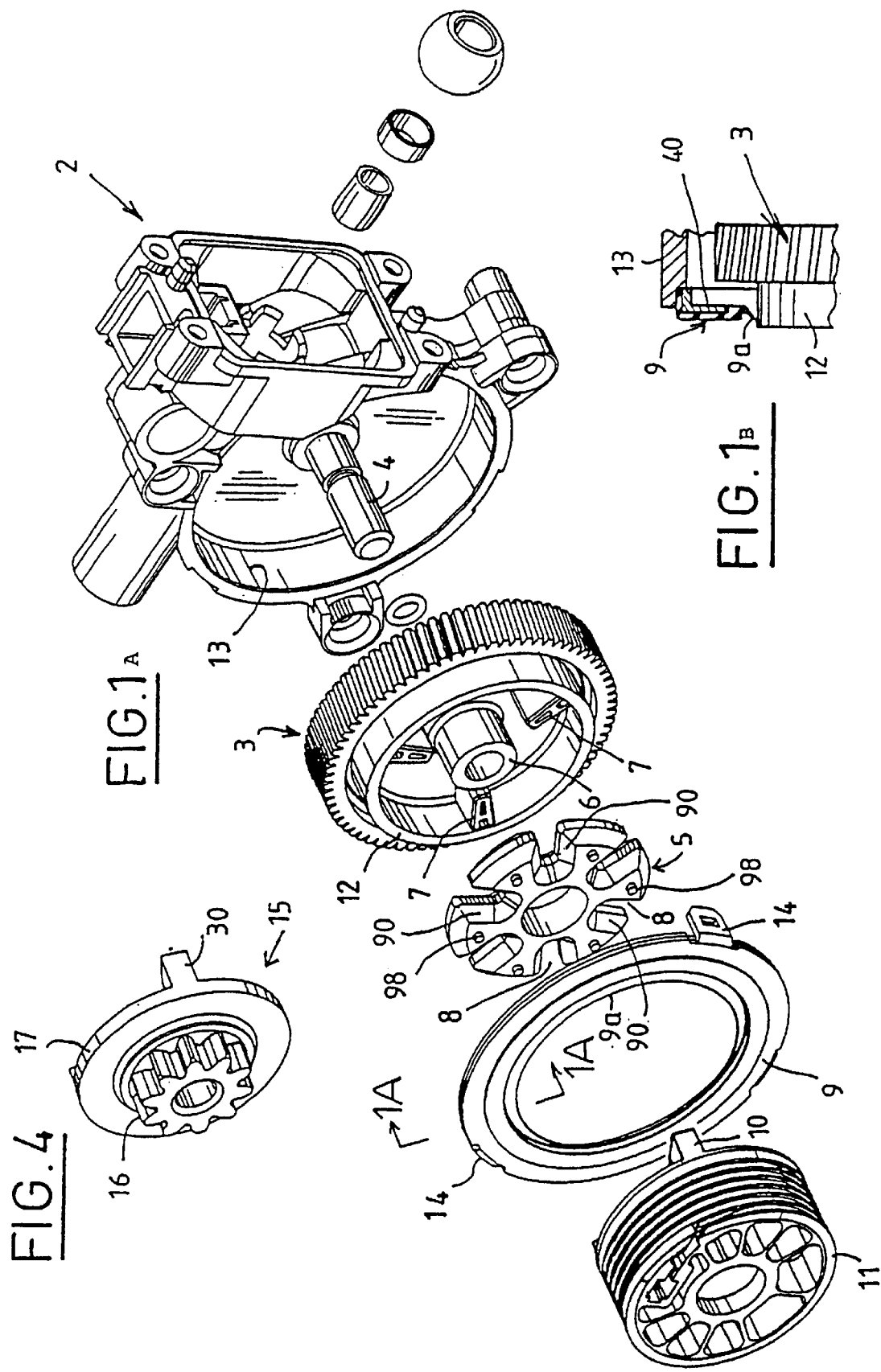
FIG. 1 is a partial exploded view, more or less to scale, of one embodiment of the motorized reduction gear according to the invention, and more particularly its reduction gearbox.

The motorized reduction gear depicted in FIGS. 1 to 4 is intended in particular for driving vehicle equipment such as electric window-lifters.

It comprises a rotor (not depicted) equipped with a rotor shaft, one end 1 of which can be seen (FIG. 2), a reduction gearbox 2 which contains a gearwheel 3 mounted on a shaft 4 perpendicular to the rotor shaft. The latter comprises an endless screw (not depicted) with which the wheel 3 is in mesh. The motorized reduction gear also comprises a single-piece damper 5 housed inside the wheel 3 and mounted concentrically with the hub 6 thereof, which additionally contains radial fins 7 which engage in corresponding radial cut-outs 8 of the damper 5 which is made of an—elastic material, preferably an elastomer. The edges of the cut-outs 8 are chamfered 90.

The damper 5 is equipped on at least one of its faces with means of centring in a cavity delimited between the wheel 3 and the output member 11. In the example described, these means consist of studs 98 moulded integrally with the rest of the damper and projecting from its faces.

The studs 98 provide the aforementioned centring effect and keep available the volume needed for the damper 5 to expand as it is compressed.

Finally, the reduction gearbox 2 comprises an annular seal 9 and a drum 11 coaxial with the damper 5 and with the wheel 3. This drum is intended to receive a cable, particularly for a window-lifter of the cable-operated type and constitutes the output member of the motorized reduction gear. The seal 9 is produced by overmoulding, for example over a metal washer 40 (FIG. 1A) force-fitted into the reduction gearbox 2. The seal 9 has at least one lip 9a bearing with sliding against an interior annular wall 12 of the gearwheel 3. The annular wall 12 is needed because the wheel 3—hub 6 connection is outside this hub and not inserted between the shaft 4 and the wheel 3.

As an alternative, the seal could be fixed to the collar and its lip could slide over the wall of the box 2.

The interior annular wall 12 projects slightly in the longitudinal direction with respect to the teeth of the wheel 3, towards the drum 11. The annular seal 9 placed between the annular wall 12 and the wall 13 of the box 2 thus seals the latter, without the need to add a cover.

To this end, the seal 9 may be secured either to the wall 13 of the box 2, for example by means of tabs 14 which clip elastically into the box, and bear with sliding against the periphery of the annular wall 12, or be secured to the latter by any appropriate means, for example, by mounting tightly into the space that lies between the annular wall 12 and the base of the gearwheel 3, then bearing with sliding against the wall 13 of the box 2.

The drum 11 is equipped with means for securing it to the damper 5 so that the two rotate as one. In the embodiment depicted, these means consist of fingers 10 of the drum 11 which engage in corresponding radial cut-outs 8. There may, for example, be six of these cut-outs 8, three of them receiving fingers 10 and three receiving the fins 7. By virtue of this arrangement, the intermediate plastic hub of the motorized reduction gears used hitherto may be omitted, the damper 5 driving the drum 11 directly.

In another embodiment of the invention, the motorized reduction gear comprises an output member 15 consisting of a pinion 16 produced as a single piece with a hub 17 (FIG. 4) inside the annular wall 12 of the gearwheel 3. The output member 15 is preferably made of sintered steel. The hub 17 is equipped with fingers 30 which engage in corresponding cut-outs 8 and allow the member 15 to be secured to the damper 5 so that they rotate as one.

Figure 2:
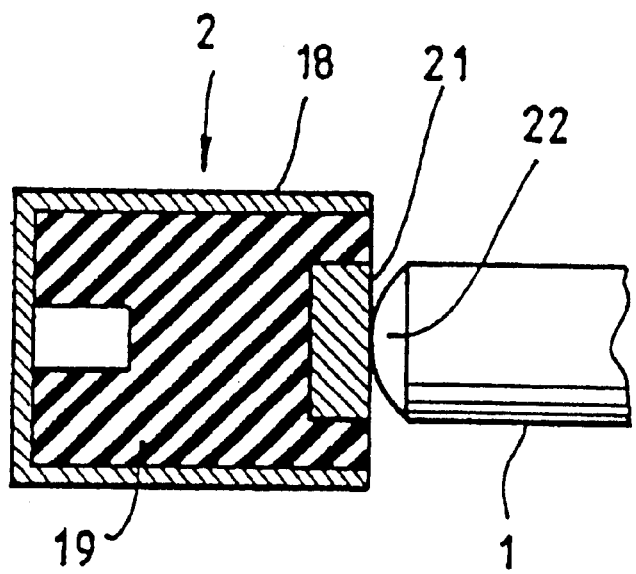
FIG. 2 is a part elevation and longitudinal section view on a larger scale of one end of the rotor shaft and of the wall of the box, illustrating the means for automatically adjusting the axial play according to the invention.
Figure 3:
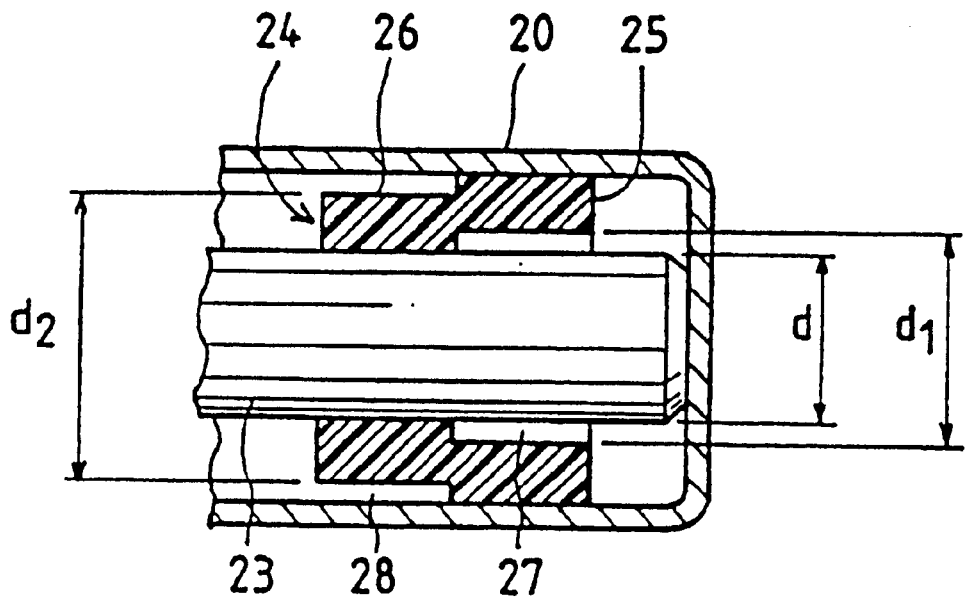
FIG. 3 is a part elevation and longitudinal section view on a larger scale of an end of the rotor shaft and of the stator, illustrating one embodiment of a ring according to the invention inserted between the shaft and the stator.

The motorized reduction gear is also equipped with means for automatically adjusting the axial play between the end 1 of the rotor shaft and the wall 18 of the box 2 (FIG. 2). In the example depicted, these adjustment means comprise a damping stop 19 made of an elastic material such as rubber, filling the volume defined at this point by the wall 18, and a metallic washer 21 embedded in the stop 19. More precisely, the washer 21 is housed in that face of the stop 19 which faces towards the shaft 3, so that the surface of the washer 21 lies flush with the transverse face of the stop 19.

The end of the shaft 1 is fitted with a plastic cap 22 bearing against the washer 21. The assembly formed by the rotor shaft 1, its end cap 22, the washer 21 and the damper 19 is mounted with slight preload in the wall 18, so as to automatically compensate for the axial play of the shaft 1.

According to an additional specific feature of the motorized reduction gear, the end 23 of the rotor shaft, which is the opposite end to the stop 19, is mounted in a ring bearing 24 made up of two radially stepped parts 25, 26.

The first part 25 has an outside diameter equal to that of the interior wall of the stator 20 against which it bears, while its inside diameter d1 is greater than the diameter $\underline{d}$ of the shaft 23. The second part 26 has an inside diameter equal to that $\underline{d}$ of the shaft 23 against which it bears, and an outside diameter d2 smaller than that of the interior wall of the stator 20.

Thus there are delimited an annular gap 27 between the end 23 of the rotor shaft and the part 25, and another annular gap 28 between the part 26 and the stator 20.

This stepped ring 24 appreciably improves the control of the play of the shaft 23, because over the part 26 that is in contact with the shaft 23, the diameter cannot vary because this part 26 is the size of the gap 28 away from the interior wall of the stator 20. Irregularities in this wall are therefore transmitted only to the part 25, to which the loadings experienced by the part 26 are transmitted. Thus, oscillations of the shaft 23 are appreciably reduced.

Figure 5:
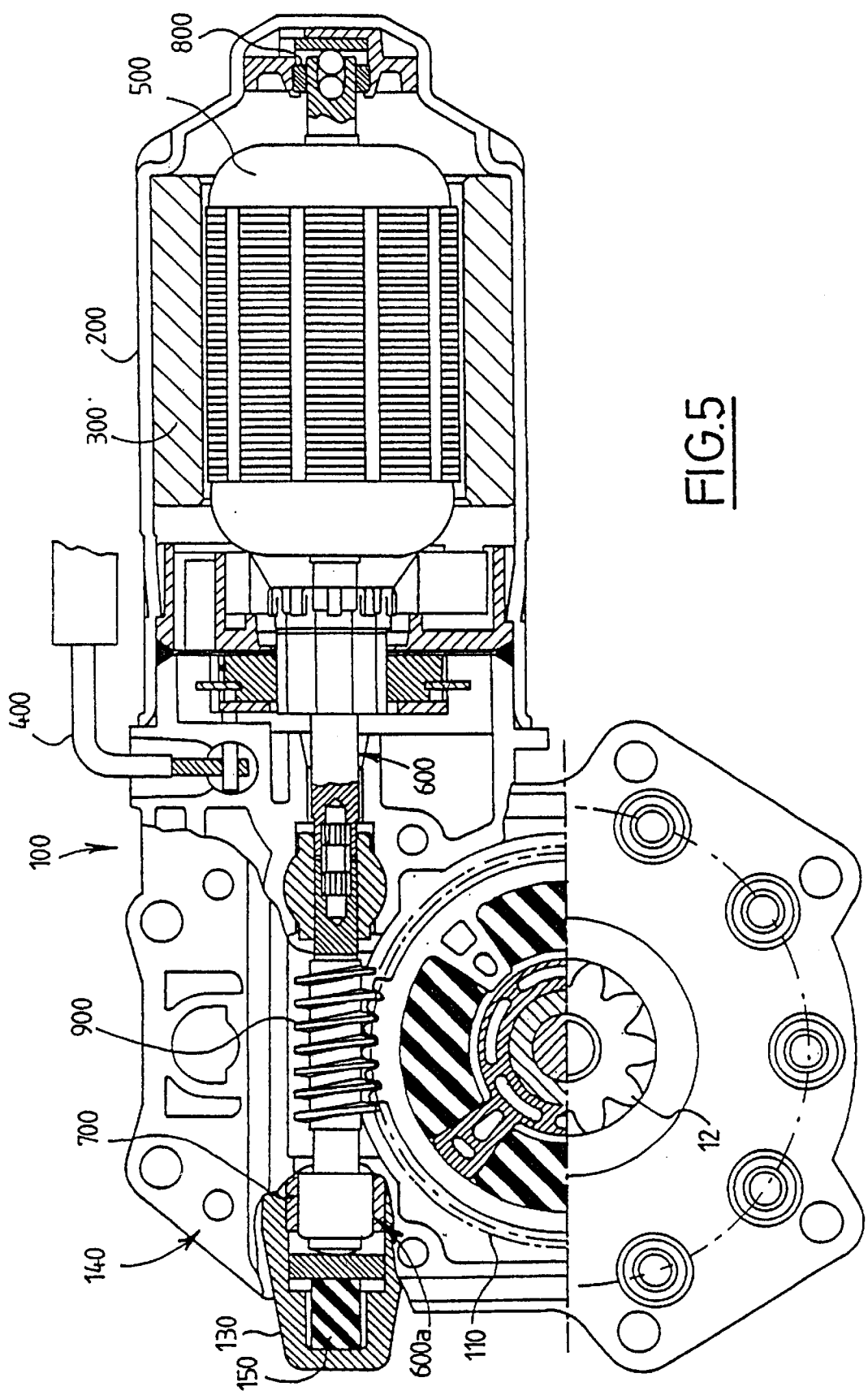
FIG. 5 is a part section and longitudinal elevation view of the motorized reduction gear equipped with a device for automatically compensating for the axial play in its line of shafts in accordance with the invention.

The motorized reduction gear 100 illustrated in FIG. 5 is intended in particular for driving vehicle equipment, such as electric window-lifters.

It comprises, housed inside a casing 200, a stator 300 which can be powered by electrical connections 400 in the known way, a rotor 500 equipped with a rotor shaft 600, the ends of which are mounted in bearing 700, 800. This rotor shaft carries an endless screw 900 in mesh with a gearwheel 110 which can drive an output member 120 which itself drives the equipment associated with the motorized reduction gear, for example, a window-lifter, a sunroof, etc.

The end 600a of the rotor shaft 600 that passes through the hearing 700 near the endless screw 900 cooperates with a device 120 for automatically compensating for the axial play between the end 600a and the wall 130 of the reduction gearbox 140, so as to balance the axial forces F developed by the rotor shaft 600 while the motorized reduction gear is operating.

Figure 9:
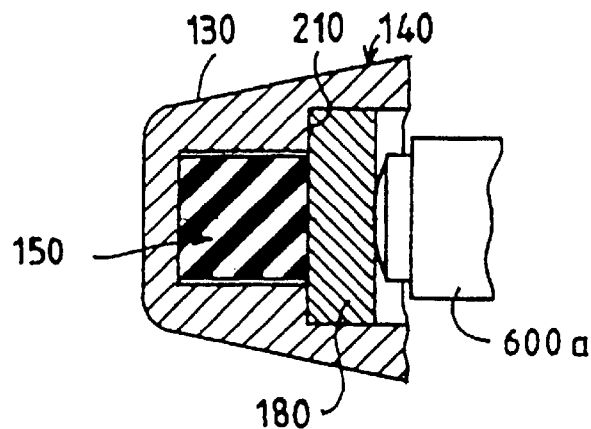
FIG. 9 is a view similar to FIG. 8 showing the device in its position when the motorized reduction gear is operating.

In the embodiment depicted, these adjustment means comprise a damper 150 made of an elastic material such as an elastomer, placed with radial annular clearance (FIG. 6) in an end housing 170 of the end of the wall 130 of the box 140, and a rigid stop 180 inserted between the end 600a of the shaft 600 and the damper 150. The rigid stop 180 is preferably metallic and forms a pad, for example a cylindrical pad, bearing against the end face of the damper 150, made, for example, of a cylinder of deformable material. The stop 100 is also in contact with an end cap 190 fixed to the end 600a of the rotor shaft 600. The rigid stop 100 can move axially in the box 140 over a predetermined travel $\underline{d}$ that corresponds to the axial play of the line of shafts between its position of rest under no load (FIG. 6) and its portion under load with the motorized reduction gear operating (FIG. 9). The travel $\underline{d}$ is limited by a stopping means, which in the example depicted consists of a transverse annular shoulder 210 arranged in the interior wall of the box 140 facing the damper 150.

Figure 7:
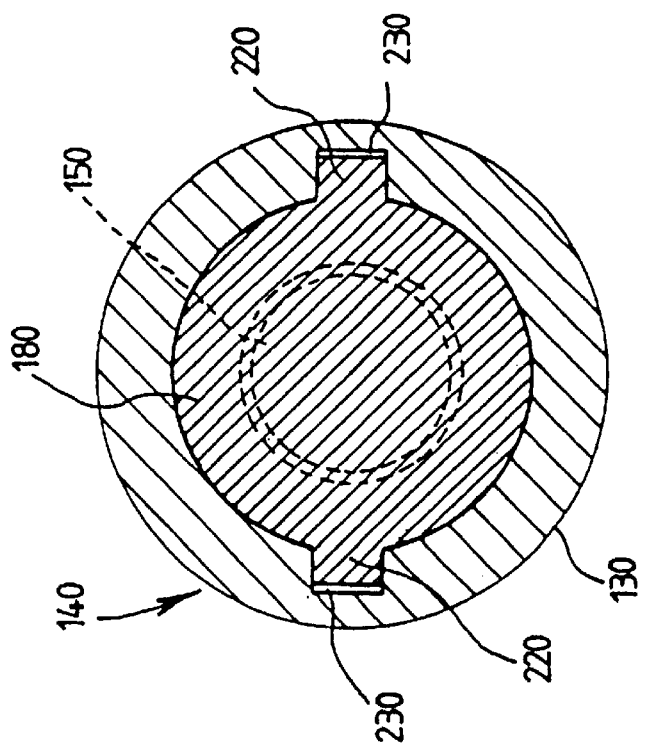
FIG. 7 is a view in cross section on 7/7 of FIG. 6.

The rigid stop 180 is equipped with means for preventing it from rotating about the axis of the rotor shaft 600. In the embodiment illustrated in FIG. 7, these means consist of two tabs 220 projecting radially from the periphery of the stop 180 and diametrically opposed and which are engaged in corresponding notchs 230 formed in the interior wall 330 of the box 140. These notchs constitute slots 230 which extend longitudinally as far as the transverse plane of the shoulder 210, so as to allow the tabs 220 to slide in these slots 230 when the stop 180 covers the travel $\underline{d}$.

The way in which the device for automatically compensating for the axial play just described works is as follows.

Figure 6:
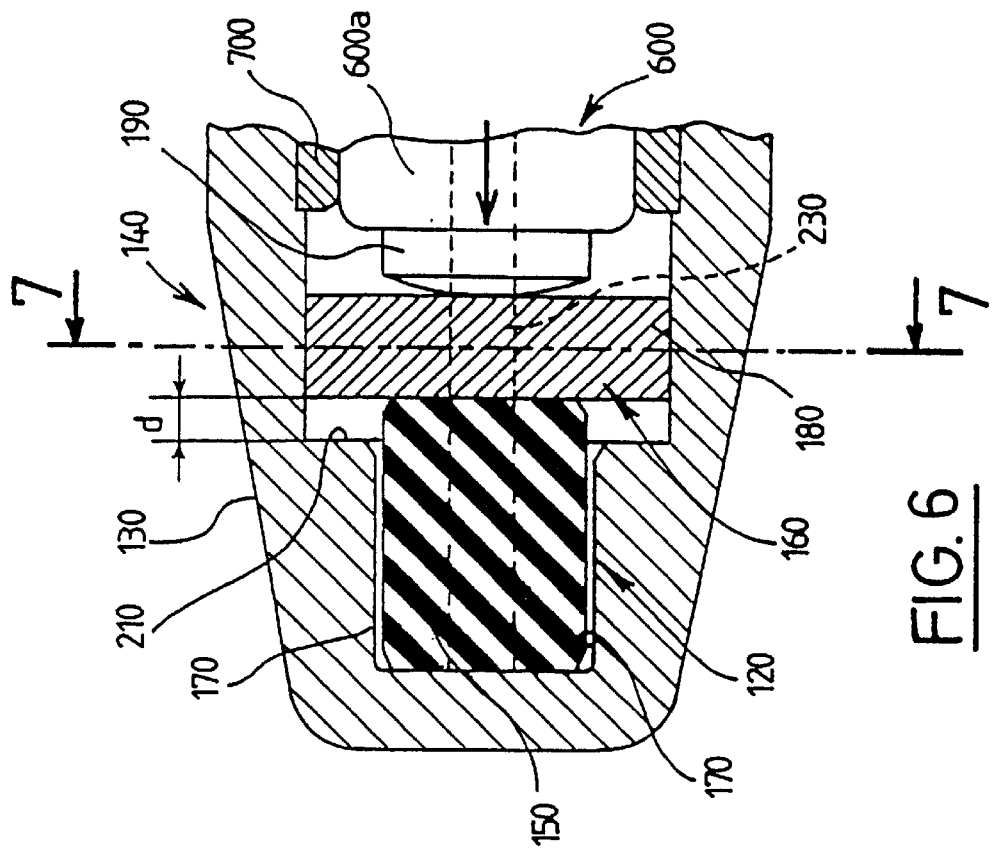
FIG. 6 is a part section view, on a larger scale than FIG. 1, of one embodiment of the means of adjusting the axial play between the end of the rotor shaft and the wall of the box, the device being at rest before load is applied.
Figure 8:
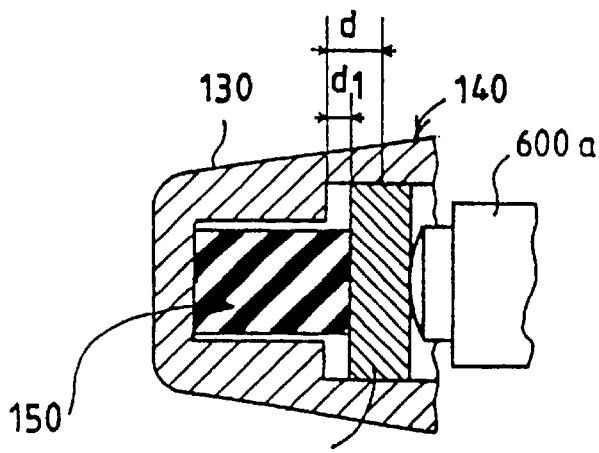
FIG. 8 is a view similar to FIG. 6, showing the device for automatically compensating for the axial play in its no-load position of the motorized reduction gear assembled for the line.

Before assembling the line of shafts, the stop 100 is the play $\underline{d}$ away from the shoulder 210 (FIG. 6). After the motorized reduction gear has been assembled and with no load applied, at rest, the line of shaft 600 is preloaded with a force F1 which is a function of the dimension d1 (FIG. 8), less than $\underline{d}$. In this position, the damper 150 experiences a precompression force of, for example, between 0 and 100 newtons, and the remaining play or dimension d1 is the result of the combination of the axial dimensions of the parts that make up the motorized reduction gear (shaft 600, stops, box 140, casing etc.).

The dimension or play d1 and the play $\underline{d}$ are illustrated in the diagram of FIG. 600, which shows that the axial force F exerted by the rotor shaft 600 on the stop 180 and on the damper 150 increases linearly from F1 to F2, that is to say until the stop 180 comes to rest against the transverse shoulder 210. The maximum force F2 experienced by the stop 150 at this instant is, for example, 100 newtons.

When the motorized reduction gear is in operation, when the axial force F on the line of shafts exceeds the predetermined value F2, the metallic stop 180 then comes into contact with the shoulder 210, which limits the compressive force on the damper 150 to the aforementioned value.

Figure 10:
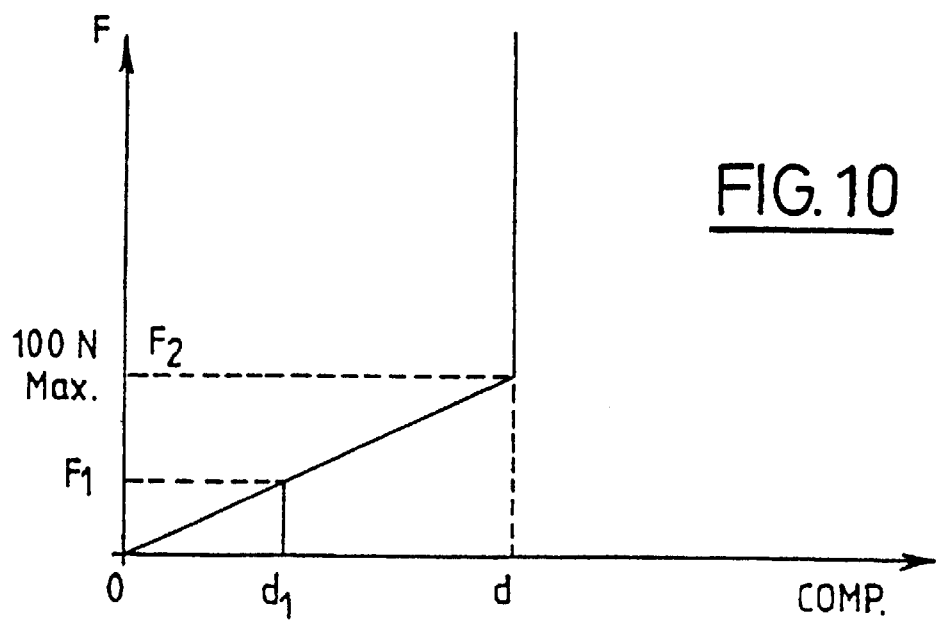
FIG. 10 is a diagram illustrating the variation in axial force developed by the box on the line of shafts of the motorized reduction gear as a function of the compression experienced by the damper of its automatic play-compensation device.

This limitation prevents the elastic material of the damper 150 from flowing and therefore prevents the damper from being damaged by axial forces that exceed the value F2 reached when the stop 180 comes up against the shoulder 210. The axial forces developed by the shaft 600 then increase abruptly (diagram of FIG. 10) and are transferred directly onto the shoulder 210 and therefore onto the wall 130 of the box 140.

The invention is not restricted to the embodiment depicted and may include various alternatives. Thus, for example, any means of preventing the rigid stop 180 from rotating can be used, it being possible, as an option, for just one tab or pad 220 to be employed.

The device for automatically compensating for the axial play of the line of shafts according to the invention is easy to produce and therefore inexpensive, while at the same time having good longevity by virtue of the fact that the compressor forces on the damper 150 are limited, this preventing it from being damaged as explained earlier.

As an alternative, the seal 9 may have more than one lip, for example may have two lips.

What is claimed is:

1. A motorized reduction gear assembly, comprising:
    a rotor equipped with a rotor shaft;
    a reduction gearbox that contains an endless screw in mesh with a gearwheel containing a damper;
    an output member rotated by the damper;
    a seal arranged between an annular wall of the gearwheel and a wall of the gearbox, the seal being one of secured to the gearbox and resting with sliding on the annular wall or secured to the annular wall and resting with sliding on the gearbox, sealing being achieved between at least one lip of the seal and the annular wall;
    wherein the damper is equipped on at least one of its faces with studs molded integrally with the rest of the damper and projecting from at least one of the lateral faces of the damper between the gearwheel and the output member, the studs leaving a volume needed for the damper to expand when compressed.

2. The assembly of claim 1, wherein the damper is made of one piece, has peripheral cut-outs with chamfered edges, the cut-outs being designed to accommodate radial fins of the gearwheel and elements for driving the output member.

3. The assembly of claim 1, wherein the seal is fixed to said wall by a washer force-fitted into the gearbox.

4. The assembly of claim claim 1, wherein the seal is secured to the gearbox by elastic tabs which clip into the wall of the gearbox.

5. The assembly of claim 1, comprising a drum coaxial with the damper, with the seal and with the gearwheel, the drum being equipped with securing means to make it rotate with the damper.

6. The assembly of claim 5, wherein the securing means includes fingers of the drum which cooperate with the damper.

7. The assembly of claim 1, wherein the output member is a pinion produced as a single piece with a hub inside the gearwheel and the hub is equipped with fingers cooperating with the damper to secure the output member to the damper to rotate in unison.

8. The assembly of claim 1, wherein the rotor shaft is mounted in a stator and a ring is inserted between the shaft and the stator, the ring is made up of two radially stepped parts, namely a first part, the outside diameter of which is equal to that of the inside wall of the stator, and the inside diameter of which is greater than that of the shaft, and a second part, the inside diameter of which is equal to that of the shaft, and the outside diameter of which is less than that of the inside wall of the stator, so that an annular gap is left between said second part and the inside wall of the stator, and an annular gap is between the shaft and the first part.

9. The assembly of claim 1, including a damping stop made of an elastomeric material and a metallic ring within the stop, and the end of the shaft bears against the ring with preload to automatically compensate for axial play.

10. The assembly of claim 1, including a damping member made of an elastomeric material and a rigid stop that limits an axial compressive load experienced by the damping member when the motorized reduction gear is in operation, the rigid stop including means for preventing the rigid stop from rotating about the axis of the rotor shaft.

11. The assembly of claim 10, wherein the rigid stop is between an end of the shaft and the damping member, the rigid stop being moveable axially relative to the shaft in the gearbox, the rigid stop being adapted to come into contact with a stopping means in the end of the gearbox.

12. The assembly of claim 11, wherein the stopping means is a transverse annular shoulder arranged in the interior wall of the gearbox facing the damping member.

13. The assembly of claim 10, wherein the means of preventing rotation includes at least one radial tab projecting from the periphery of the rigid stop and engaged in a corresponding notch in the interior wall of the gearbox, and forming a longitudinal slot which allows the rigid stop to slide over a travel that is equal to the axial play.

14. A motorized reduction gear assembly, comprising:
a rotor equipped with a rotor shaft;
a reduction gearbox that contains an endless screw in mesh with a gearwheel containing a damper;
an output member rotated by the damper;
a seal arranged between an annular wall of the gearwheel and a wall of the gearbox, the seal being on of secured to the gearbox and resting with sliding on the annular wall or secured to the annular wall and resting with sliding on the gearbox, sealing being achieved between at least one lip of the seal and the annular wall; and
a drum coaxial with the damper, with the seal and with the gearwheel, the drum being secured to the damper to rotate in unison.

15. The assembly of claim 14, wherein the drum includes fingers which cooperate with the damper.

16. A motorized reduction gear assembly, comprising:
a rotor equipped with a rotor shaft;
a reduction gearbox that contains an endless screw in mesh with a gearwheel containing a damper;
an output member rotated by the damper;
a seal arranged between an annular wall of the gearwheel and a wall of the gearbox, the seal being one of secured to the gearbox and resting with sliding on the annular wall or secured to the annular wall and resting with sliding on the gearbox, sealing being achieved between at least one lip of the seal and the annular wall; and
a damping member made of an elastomeric material and a rigid stop system designed to limit to a predetermined value the axial compressive load experienced by the damping member when the motorized reduction gear is in operation, the rigid stop being prevented from rotating about the axis of the rotor shaft.

17. The assembly of claim 16, wherein the rigid stop is between an end of the shaft and the damping member, the rigid stop being moveable axially relative to the shaft in the gearbox, the rigid stop being adapted to come into contact with a stopping means in the end of the gearbox.

18. The assembly of claim 17, wherein the stopping means is a transverse annular shoulder arranged in the interior wall of the gearbox facing the damping member.

19. The assembly of claim 16, including at least one radial tab projecting from the periphery of the rigid stop and engaged in a corresponding notch in the interior wall of the gearbox, and forming a longitudinal slot which allows the rigid stop to slide over a travel that is equal to the axial play.

* * * * *